United States Patent
Meyer et al.

(10) Patent No.: US 9,779,449 B2
(45) Date of Patent: Oct. 3, 2017

(54) VERACITY DETERMINATION THROUGH COMPARISON OF A GEOSPATIAL LOCATION OF A VEHICLE WITH A PROVIDED DATA

(71) Applicant: Spireon, Inc., Irvine, CA (US)

(72) Inventors: David M. Meyer, Knoxville, TN (US); Mark J. Behnke, Littleton, CO (US)

(73) Assignee: Spireon, Inc., Irvine, CA (US)

(*) Notice: Subject to any disclaimer, the term of this patent is extended or adjusted under 35 U.S.C. 154(b) by 408 days.

(21) Appl. No.: 14/014,360

(22) Filed: Aug. 30, 2013

(65) Prior Publication Data
US 2015/0066362 A1    Mar. 5, 2015

(51) Int. Cl.
*G01C 21/20* (2006.01)
*G06Q 30/06* (2012.01)
*H04W 4/04* (2009.01)
*G08G 1/00* (2006.01)

(52) U.S. Cl.
CPC ........ *G06Q 30/0645* (2013.01); *H04W 4/046* (2013.01); *G08G 1/20* (2013.01)

(58) Field of Classification Search
CPC ... G01C 21/20; G01C 21/26; G06F 17/30241; G08G 1/20
USPC ................................. 701/468, 522
See application file for complete search history.

(56) References Cited

U.S. PATENT DOCUMENTS

| 4,067,061 A | 1/1978 | Juhasz |
|---|---|---|
| 4,633,407 A | 12/1986 | Freienstein et al. |
| 4,654,821 A | 3/1987 | Lapp |
| 4,663,725 A | 5/1987 | Truckenbrod et al. |
| 4,675,539 A | 6/1987 | Nichol |
| 4,695,946 A | 9/1987 | Andreasen et al. |

(Continued)

FOREIGN PATENT DOCUMENTS

| CA | 2609106 A1 | 10/2008 |
|---|---|---|
| CA | 2688263 A1 | 12/2008 |

(Continued)

OTHER PUBLICATIONS

"Save Money on Fleet Fueling Purchases", Sokolis Group Fuel Managment, Jan. 26, 2011 by Sokolis (p. 1) http://www.sokolisgroup.com/blog/save-money-on-fleet-fueling-purchases/.

(Continued)

*Primary Examiner* — Khoi Tran
*Assistant Examiner* — Majdi Alsomiri
(74) *Attorney, Agent, or Firm* — Luedeka Neely Group, PC (57) ABSTRACT

A method, apparatus and system related to veracity determination through comparison of a geospatial location data of a vehicle with a provided data are disclosed. In one aspect, the method of a veracity server associates a provided data of an individual with a vehicle using a processor, determines the geospatial location of a vehicle, correlates a relevance of the geospatial location of the vehicle with the provided data, and determines the veracity of the provided data based on the relevance of the geospatial location of the vehicle to the provided data. The method may also comprise the usage of a geospatial circuit in the vehicle in order to transmit geospatial coordinates as well as a plurality of relevant locational information of the vehicle to the veracity server in order to make a correct veracity determination of the provided data.

20 Claims, 6 Drawing Sheets

(56) References Cited

U.S. PATENT DOCUMENTS

| | | |
|---|---|---|
| 4,701,845 A | 10/1987 | Andreasen et al. |
| 4,727,360 A | 2/1988 | Ferguson et al. |
| 4,837,700 A | 6/1989 | Ando et al. |
| 4,884,242 A | 11/1989 | Lacy et al. |
| 4,891,650 A | 1/1990 | Sheffer |
| 4,907,150 A | 3/1990 | Arroyo et al. |
| 5,119,301 A | 6/1992 | Shimizu et al. |
| 5,122,959 A | 6/1992 | Nathanson et al. |
| 5,208,756 A | 5/1993 | Song |
| 5,218,367 A | 6/1993 | Sheffer et al. |
| 5,223,844 A | 6/1993 | Mansell et al. |
| 5,276,865 A | 1/1994 | Thorpe |
| 5,289,369 A | 2/1994 | Hirshberg |
| 5,299,132 A | 3/1994 | Wortham |
| 5,307,277 A | 4/1994 | Hirano |
| 5,390,125 A | 2/1995 | Sennott et al. |
| 5,408,411 A | 4/1995 | Nakamura et al. |
| 5,424,952 A | 6/1995 | Asayama |
| 5,457,439 A | 10/1995 | Kuhn |
| 5,515,419 A | 5/1996 | Sheffer |
| 5,521,579 A | 5/1996 | Bernhard |
| 5,610,815 A | 3/1997 | Gudat et al. |
| 5,684,474 A | 11/1997 | Gilon et al. |
| 5,686,888 A | 11/1997 | Welles, II et al. |
| 5,708,820 A | 1/1998 | Park et al. |
| 5,712,789 A | 1/1998 | Radican |
| 5,751,245 A | 5/1998 | Janky et al. |
| 5,805,103 A | 9/1998 | Doi et al. |
| 5,867,804 A | 2/1999 | Pilley et al. |
| 5,870,029 A | 2/1999 | Otto et al. |
| 5,877,956 A | 3/1999 | Frank et al. |
| 5,917,433 A | 6/1999 | Keillor et al. |
| 5,923,243 A | 7/1999 | Bleiner |
| 5,949,974 A | 9/1999 | Ewing et al. |
| 5,978,236 A | 11/1999 | Faberman et al. |
| 6,029,111 A | 2/2000 | Croyle |
| 6,067,044 A | 5/2000 | Whelan et al. |
| 6,075,441 A | 6/2000 | Maloney |
| 6,091,323 A | 7/2000 | Kawai |
| 6,148,291 A | 11/2000 | Radican |
| 6,154,152 A | 11/2000 | Ito |
| 6,181,029 B1 | 1/2001 | Berglund et al. |
| 6,202,023 B1 | 3/2001 | Hancock et al. |
| 6,204,764 B1 | 3/2001 | Maloney |
| 6,226,389 B1 | 5/2001 | Lemelson et al. |
| 6,233,563 B1 | 5/2001 | Jefferson et al. |
| 6,240,365 B1 | 5/2001 | Bunn |
| 6,249,217 B1 | 6/2001 | Forbes |
| 6,266,008 B1 | 7/2001 | Huston et al. |
| 6,275,773 B1 | 8/2001 | Lemelson et al. |
| 6,317,693 B2 | 11/2001 | Kodaka et al. |
| 6,338,011 B1 | 1/2002 | Furst et al. |
| 6,339,369 B1 | 1/2002 | Paranjpe |
| 6,339,745 B1 | 1/2002 | Novik |
| 6,363,320 B1 | 3/2002 | Chou |
| 6,385,539 B1 | 5/2002 | Wilson et al. |
| 6,388,580 B1 | 5/2002 | Graham |
| 6,393,582 B1 | 5/2002 | Klecka et al. |
| 6,393,584 B1 | 5/2002 | McLaren et al. |
| 6,415,227 B1 | 7/2002 | Lin |
| 6,483,434 B1 | 11/2002 | Umiker |
| 6,502,080 B1 | 12/2002 | Eichorst et al. |
| 6,510,381 B2 | 1/2003 | Grounds et al. |
| 6,512,465 B2 | 1/2003 | Flick |
| 6,577,921 B1 | 6/2003 | Carson |
| 6,584,403 B2 | 6/2003 | Bunn |
| 6,701,234 B1 | 3/2004 | Vogelsang |
| 6,704,810 B1 | 3/2004 | Krehbiel, Jr. et al. |
| 6,714,857 B2 | 3/2004 | Kapolka et al. |
| 6,717,527 B2 | 4/2004 | Simon |
| 6,720,920 B2 | 4/2004 | Breed et al. |
| 6,737,963 B2 | 5/2004 | Gutta et al. |
| 6,748,320 B2 | 6/2004 | Jones |
| 6,771,970 B1 | 8/2004 | Dan |
| 6,816,090 B2 | 11/2004 | Teckchandani et al. |
| 6,832,153 B2 | 12/2004 | Thayer et al. |
| 6,844,827 B2 | 1/2005 | Flick |
| 6,856,902 B1 | 2/2005 | Mitchem |
| 6,871,137 B2 | 3/2005 | Scaer et al. |
| 6,873,963 B1 | 3/2005 | Westbury et al. |
| 6,904,359 B2 | 6/2005 | Jones |
| 6,930,638 B2 | 8/2005 | Lloyd et al. |
| 6,931,309 B2 | 8/2005 | Phelan et al. |
| 6,985,087 B2 | 1/2006 | Soliman |
| 7,035,856 B1 | 4/2006 | Morimoto |
| 7,039,520 B2 | 5/2006 | Draeger et al. |
| 7,065,445 B2 | 6/2006 | Thayer et al. |
| 7,072,764 B2 | 7/2006 | Donath et al. |
| 7,091,835 B2 | 8/2006 | Boulay et al. |
| 7,096,392 B2 | 8/2006 | Sim-Tang |
| 7,099,934 B1 | 8/2006 | Ewing et al. |
| 7,154,390 B2 | 12/2006 | Giermanski et al. |
| 7,170,390 B2 | 1/2007 | Quinones et al. |
| 7,174,243 B1 | 2/2007 | Lightner et al. |
| 7,177,738 B2 | 2/2007 | Diaz |
| 7,212,134 B2 | 5/2007 | Taylor |
| 7,215,255 B2 | 5/2007 | Grush |
| 7,242,303 B2 | 7/2007 | Patel et al. |
| 7,253,731 B2 | 8/2007 | Joao |
| 7,266,378 B2 | 9/2007 | Norta et al. |
| 7,283,046 B2 | 10/2007 | Culpepper et al. |
| 7,289,019 B1 | 10/2007 | Kertes |
| 7,302,344 B2 | 11/2007 | Olney et al. |
| 7,308,611 B2 | 12/2007 | Booth |
| 7,327,238 B2 | 2/2008 | Bhogal et al. |
| 7,339,469 B2 | 3/2008 | Braun |
| 7,343,306 B1 | 3/2008 | Bates et al. |
| 7,346,439 B2 | 3/2008 | Bodin |
| 7,346,790 B1 | 3/2008 | Klein |
| 7,405,658 B2 | 7/2008 | Richards |
| 7,446,649 B2 | 11/2008 | Bhogal et al. |
| 7,455,225 B1 | 11/2008 | Hadfield et al. |
| 7,467,325 B2 | 12/2008 | Eisen et al. |
| 7,472,202 B2 | 12/2008 | Parupudi et al. |
| 7,479,877 B2 | 1/2009 | Mortenson et al. |
| 7,486,176 B2 | 2/2009 | Bhogal et al. |
| 7,489,993 B2 | 2/2009 | Coffee et al. |
| 7,527,288 B2 | 5/2009 | Breed |
| 7,552,008 B2 | 6/2009 | Newstrom et al. |
| 7,555,370 B2 | 6/2009 | Breed et al. |
| 7,571,051 B1 | 8/2009 | Shulman |
| 7,574,195 B2 | 8/2009 | Krasner et al. |
| 7,580,782 B2 | 8/2009 | Breed et al. |
| 7,593,999 B2 | 9/2009 | Nathanson |
| 7,600,150 B2 | 10/2009 | Wu |
| 7,617,037 B2 | 11/2009 | Desens et al. |
| 7,650,210 B2 | 1/2010 | Breed |
| 7,652,568 B2 | 1/2010 | Waugh et al. |
| 7,657,354 B2 | 2/2010 | Breed et al. |
| 7,668,931 B2 | 2/2010 | Parupudi et al. |
| 7,672,756 B2 | 3/2010 | Breed |
| 7,693,626 B2 | 4/2010 | Breed et al. |
| 7,701,363 B1 | 4/2010 | Zlojutro |
| 7,725,216 B2 | 5/2010 | Kim |
| 7,746,228 B2 | 6/2010 | Sensenig et al. |
| 7,751,944 B2 | 7/2010 | Parupudi et al. |
| 7,755,541 B2 | 7/2010 | Wisherd et al. |
| 7,769,499 B2 | 8/2010 | McQuade et al. |
| 7,774,633 B1 | 8/2010 | Harrenstien et al. |
| 7,817,033 B2 | 10/2010 | Motoyama |
| 7,876,239 B2 | 1/2011 | Horstemeyer |
| 7,893,818 B2 | 2/2011 | Smoyer et al. |
| 7,899,591 B2 | 3/2011 | Shah et al. |
| 7,899,621 B2 | 3/2011 | Breed et al. |
| 7,916,026 B2 | 3/2011 | Johnson et al. |
| 7,950,570 B2 | 5/2011 | Marchasin et al. |
| 7,971,095 B2 | 6/2011 | Hess et al. |
| 7,987,017 B2 | 7/2011 | Buzzoni et al. |
| 8,009,034 B2 | 8/2011 | Dobson et al. |
| 8,009,086 B2 | 8/2011 | Grossnick et al. |
| 8,095,304 B2 | 1/2012 | Blanton et al. |
| 8,103,450 B2 | 1/2012 | Takaoka |
| 8,103,741 B2 | 1/2012 | Frazier et al. |
| 8,106,757 B2 | 1/2012 | Brinton et al. |

(56) References Cited

U.S. PATENT DOCUMENTS

| | | |
|---|---|---|
| 8,111,154 B1 | 2/2012 | Puri et al. |
| 8,126,601 B2 | 2/2012 | Kapp et al. |
| 8,181,868 B2 | 5/2012 | Thomas et al. |
| 8,185,767 B2 | 5/2012 | Ballou et al. |
| 8,201,009 B2 | 6/2012 | Sun et al. |
| 8,237,591 B2 | 8/2012 | Holcomb et al. |
| 8,255,144 B2 | 8/2012 | Breed et al. |
| 8,279,067 B2 | 10/2012 | Berger et al. |
| 8,299,920 B2 | 10/2012 | Hamm et al. |
| 8,306,687 B2 | 11/2012 | Chen |
| 8,311,858 B2 | 11/2012 | Everett et al. |
| 8,326,813 B2 | 12/2012 | Nizami et al. |
| 8,330,626 B1 | 12/2012 | Adelson |
| 8,330,817 B1 | 12/2012 | Foster |
| 8,368,561 B2 | 2/2013 | Welch et al. |
| 8,380,426 B2 | 2/2013 | Konijnendijk |
| 8,398,405 B2 | 3/2013 | Kumar |
| 8,407,139 B1 | 3/2013 | Palmer |
| 8,452,771 B2 | 5/2013 | Kurciska et al. |
| 8,462,021 B2 | 6/2013 | Welch et al. |
| 8,467,324 B2 | 6/2013 | Yousefi et al. |
| 8,489,907 B2 | 7/2013 | Wakrat et al. |
| 8,502,661 B2 | 8/2013 | Mauro et al. |
| 8,504,233 B1 | 8/2013 | Ferguson et al. |
| 8,504,512 B2 | 8/2013 | Herzog et al. |
| 8,510,200 B2 | 8/2013 | Pearlman et al. |
| 8,527,135 B2 | 9/2013 | Lowrey et al. |
| 8,565,963 B2 | 10/2013 | Burke, Jr. |
| 8,587,430 B2 | 11/2013 | Ferguson et al. |
| 8,612,137 B2 | 12/2013 | Harris et al. |
| 8,626,152 B2 | 1/2014 | Farrell et al. |
| 8,655,544 B2 | 2/2014 | Fletcher et al. |
| 8,655,983 B1 | 2/2014 | Harris et al. |
| 8,671,063 B2 | 3/2014 | Ehrman et al. |
| 8,700,249 B1 | 4/2014 | Carrithers |
| 8,718,536 B2 | 5/2014 | Hannon |
| 8,725,326 B2 | 5/2014 | Kapp et al. |
| 8,725,342 B2 | 5/2014 | Ferguson et al. |
| 8,762,009 B2 | 6/2014 | Ehrman et al. |
| 8,766,797 B2 | 7/2014 | Hamm et al. |
| 8,770,480 B2 | 7/2014 | Gulli |
| 8,781,169 B2 | 7/2014 | Jackson et al. |
| 8,781,958 B2 | 7/2014 | Michael |
| 8,799,461 B2 | 8/2014 | Herz et al. |
| 8,839,026 B2 | 9/2014 | Kopylovitz |
| 8,933,802 B2 | 1/2015 | Baade |
| 8,970,701 B2 | 3/2015 | Lao |
| 9,049,564 B2 | 6/2015 | Muetzel et al. |
| 2001/0006398 A1 | 7/2001 | Nakamura et al. |
| 2001/0018628 A1 | 8/2001 | Jenkins et al. |
| 2001/0018639 A1 | 8/2001 | Bunn |
| 2001/0034577 A1 | 10/2001 | Grounds et al. |
| 2001/0037298 A1 | 11/2001 | Ehrman et al. |
| 2002/0000916 A1 | 1/2002 | Richards |
| 2002/0014978 A1 | 2/2002 | Flick |
| 2002/0059126 A1 | 5/2002 | Ricciardi |
| 2002/0070891 A1 | 6/2002 | Huston et al. |
| 2002/0082025 A1 | 6/2002 | Baese et al. |
| 2002/0173905 A1* | 11/2002 | Jin et al. ............ 701/207 |
| 2002/0184062 A1 | 12/2002 | Diaz |
| 2002/0186144 A1 | 12/2002 | Meunier |
| 2002/0198632 A1 | 12/2002 | Breed et al. |
| 2003/0009361 A1 | 1/2003 | Hancock et al. |
| 2003/0013146 A1 | 1/2003 | Werb |
| 2003/0018428 A1 | 1/2003 | Knockeart et al. |
| 2003/0023614 A1 | 1/2003 | Newstrom et al. |
| 2003/0055542 A1 | 3/2003 | Knockeart et al. |
| 2003/0055553 A1 | 3/2003 | Knockeart et al. |
| 2003/0083060 A1 | 5/2003 | Menendez |
| 2003/0125855 A1 | 7/2003 | Breed et al. |
| 2003/0151501 A1 | 8/2003 | Teckchandani et al. |
| 2003/0151507 A1 | 8/2003 | Andre et al. |
| 2003/0158638 A1 | 8/2003 | Yakes et al. |
| 2003/0158639 A1 | 8/2003 | Nada |
| 2003/0163228 A1 | 8/2003 | Pillar et al. |
| 2003/0163229 A1 | 8/2003 | Pillar et al. |
| 2003/0163230 A1 | 8/2003 | Pillar et al. |
| 2003/0171854 A1 | 9/2003 | Pillar et al. |
| 2003/0174067 A1 | 9/2003 | Soliman |
| 2003/0176959 A1 | 9/2003 | Breed |
| 2003/0191567 A1 | 10/2003 | Gentilcore |
| 2003/0191568 A1 | 10/2003 | Breed |
| 2003/0204407 A1 | 10/2003 | Nabors et al. |
| 2004/0006398 A1 | 1/2004 | Bickford |
| 2004/0006413 A1 | 1/2004 | Kane et al. |
| 2004/0049337 A1 | 3/2004 | Knockeart et al. |
| 2004/0056797 A1 | 3/2004 | Knockeart et al. |
| 2004/0093291 A1 | 5/2004 | Bodin |
| 2004/0102895 A1 | 5/2004 | Thayer et al. |
| 2004/0102896 A1 | 5/2004 | Thayer et al. |
| 2004/0130440 A1 | 7/2004 | Boulay et al. |
| 2004/0143378 A1 | 7/2004 | Vogelsang |
| 2004/0162063 A1 | 8/2004 | Quinones et al. |
| 2004/0199285 A1 | 10/2004 | Berichon et al. |
| 2004/0199302 A1 | 10/2004 | Pillar et al. |
| 2004/0204969 A1 | 10/2004 | Wu |
| 2004/0225557 A1 | 11/2004 | Phelan et al. |
| 2004/0246177 A1 | 12/2004 | Lloyd et al. |
| 2005/0004748 A1 | 1/2005 | Pinto et al. |
| 2005/0007450 A1 | 1/2005 | Hill et al. |
| 2005/0021199 A1 | 1/2005 | Zimmerman et al. |
| 2005/0021722 A1 | 1/2005 | Metzger |
| 2005/0043879 A1 | 2/2005 | Desens et al. |
| 2005/0060069 A1 | 3/2005 | Breed et al. |
| 2005/0080565 A1 | 4/2005 | Olney et al. |
| 2005/0114023 A1 | 5/2005 | Williamson et al. |
| 2005/0131597 A1 | 6/2005 | Raz et al. |
| 2005/0134504 A1 | 6/2005 | Harwood et al. |
| 2005/0149251 A1 | 7/2005 | Donath et al. |
| 2005/0171798 A1 | 8/2005 | Croft et al. |
| 2005/0216294 A1 | 9/2005 | Labow |
| 2005/0237166 A1 | 10/2005 | Chen |
| 2006/0041341 A1 | 2/2006 | Kane et al. |
| 2006/0041342 A1 | 2/2006 | Kane et al. |
| 2006/0052913 A1 | 3/2006 | Kane et al. |
| 2006/0053075 A1 | 3/2006 | Roth et al. |
| 2006/0055561 A1 | 3/2006 | Kamali et al. |
| 2006/0074558 A1 | 4/2006 | Williamson et al. |
| 2006/0087411 A1 | 4/2006 | Chang |
| 2006/0089786 A1 | 4/2006 | Soehren |
| 2006/0109106 A1 | 5/2006 | Braun |
| 2006/0129290 A1 | 6/2006 | Zimmerman et al. |
| 2006/0155427 A1 | 7/2006 | Yang |
| 2006/0155434 A1 | 7/2006 | Kane et al. |
| 2006/0187026 A1 | 8/2006 | Kochis |
| 2006/0253234 A1 | 11/2006 | Kane et al. |
| 2006/0273922 A1 | 12/2006 | Bhogal et al. |
| 2007/0005202 A1 | 1/2007 | Breed |
| 2007/0027726 A1 | 2/2007 | Warren et al. |
| 2007/0057781 A1 | 3/2007 | Breed |
| 2007/0061054 A1 | 3/2007 | Rowe et al. |
| 2007/0061076 A1 | 3/2007 | Shulman |
| 2007/0086624 A1 | 4/2007 | Breed et al. |
| 2007/0087756 A1 | 4/2007 | Hoffberg |
| 2007/0096565 A1 | 5/2007 | Breed et al. |
| 2007/0096899 A1 | 5/2007 | Johnson |
| 2007/0115101 A1 | 5/2007 | Creekbaum et al. |
| 2007/0135984 A1 | 6/2007 | Breed et al. |
| 2007/0139216 A1 | 6/2007 | Breed |
| 2007/0156317 A1 | 7/2007 | Breed |
| 2007/0159354 A1 | 7/2007 | Rosenberg |
| 2007/0162550 A1 | 7/2007 | Rosenberg |
| 2007/0167147 A1 | 7/2007 | Krasner et al. |
| 2007/0185625 A1 | 8/2007 | Pillar et al. |
| 2007/0200690 A1 | 8/2007 | Bhogal et al. |
| 2007/0239322 A1 | 10/2007 | McQuade et al. |
| 2007/0244614 A1 | 10/2007 | Nathanson |
| 2007/0285240 A1 | 12/2007 | Sensenig et al. |
| 2007/0290836 A1 | 12/2007 | Ainsworth et al. |
| 2007/0290923 A1 | 12/2007 | Norta et al. |
| 2008/0015748 A1 | 1/2008 | Nagy |
| 2008/0036187 A1 | 2/2008 | Breed |
| 2008/0040004 A1 | 2/2008 | Breed |
| 2008/0040005 A1 | 2/2008 | Breed |

(56) References Cited

U.S. PATENT DOCUMENTS

| | | |
|---|---|---|
| 2008/0040023 A1 | 2/2008 | Breed et al. |
| 2008/0040268 A1 | 2/2008 | Corn |
| 2008/0042875 A1 | 2/2008 | Harrington et al. |
| 2008/0046150 A1 | 2/2008 | Breed |
| 2008/0051957 A1 | 2/2008 | Breed et al. |
| 2008/0051995 A1 | 2/2008 | Lokshin et al. |
| 2008/0061953 A1 | 3/2008 | Bhogal et al. |
| 2008/0065291 A1 | 3/2008 | Breed |
| 2008/0077285 A1 | 3/2008 | Kumar et al. |
| 2008/0077326 A1 | 3/2008 | Funk et al. |
| 2008/0091350 A1 | 4/2008 | Smith et al. |
| 2008/0111546 A1 | 5/2008 | Takahashi et al. |
| 2008/0119993 A1 | 5/2008 | Breed |
| 2008/0147265 A1 | 6/2008 | Breed |
| 2008/0147280 A1 | 6/2008 | Breed |
| 2008/0157510 A1 | 7/2008 | Breed et al. |
| 2008/0162045 A1 | 7/2008 | Lee |
| 2008/0167821 A1 | 7/2008 | Breed |
| 2008/0176537 A1 | 7/2008 | Smoyer et al. |
| 2008/0183344 A1 | 7/2008 | Doyen et al. |
| 2008/0183376 A1 | 7/2008 | Knockeart et al. |
| 2008/0195261 A1 | 8/2008 | Breed |
| 2008/0195432 A1 | 8/2008 | Fell et al. |
| 2008/0215190 A1 | 9/2008 | Pillar et al. |
| 2008/0234933 A1 | 9/2008 | Chowdhary et al. |
| 2008/0235105 A1 | 9/2008 | Payne et al. |
| 2008/0252431 A1 | 10/2008 | Nigam |
| 2008/0262669 A1 | 10/2008 | Smid et al. |
| 2008/0278314 A1 | 11/2008 | Miller et al. |
| 2008/0294302 A1 | 11/2008 | Basir |
| 2008/0318547 A1 | 12/2008 | Ballou, Jr. et al. |
| 2009/0033494 A1 | 2/2009 | Malik |
| 2009/0079591 A1 | 3/2009 | Motoyama |
| 2009/0082918 A1 | 3/2009 | Hendrix, Jr. |
| 2009/0112394 A1 | 4/2009 | Lepejian et al. |
| 2009/0138497 A1 | 5/2009 | Zavoli et al. |
| 2009/0140887 A1* | 6/2009 | Breed et al. .................. 340/990 |
| 2009/0177378 A1 | 7/2009 | Kamalski et al. |
| 2009/0261975 A1 | 10/2009 | Ferguson et al. |
| 2009/0273489 A1 | 11/2009 | Lu |
| 2009/0326808 A1 | 12/2009 | Blanton et al. |
| 2010/0036793 A1 | 2/2010 | Willis et al. |
| 2010/0049669 A1 | 2/2010 | Mazzarolo |
| 2010/0057279 A1 | 3/2010 | Kyllingstad |
| 2010/0057305 A1 | 3/2010 | Breed |
| 2010/0071572 A1 | 3/2010 | Carroll et al. |
| 2010/0076878 A1 | 3/2010 | Burr et al. |
| 2010/0082195 A1 | 4/2010 | Lee et al. |
| 2010/0094482 A1 | 4/2010 | Schofield et al. |
| 2010/0094500 A1 | 4/2010 | Jin |
| 2010/0117868 A1 | 5/2010 | Van Wiemeersch et al. |
| 2010/0127867 A1 | 5/2010 | Chien et al. |
| 2010/0152972 A1 | 6/2010 | Attard et al. |
| 2010/0169009 A1 | 7/2010 | Breed et al. |
| 2010/0174487 A1 | 7/2010 | Soehren |
| 2010/0191412 A1 | 7/2010 | Kim |
| 2010/0207754 A1 | 8/2010 | Shostak et al. |
| 2010/0250411 A1 | 9/2010 | Ogrodski |
| 2010/0265104 A1 | 10/2010 | Zlojutro |
| 2010/0274415 A1 | 10/2010 | Lam |
| 2010/0332080 A1 | 12/2010 | Bae |
| 2010/0332118 A1 | 12/2010 | Geelen et al. |
| 2010/0332363 A1 | 12/2010 | Duddle et al. |
| 2011/0016340 A1 | 1/2011 | Sun et al. |
| 2011/0060496 A1 | 3/2011 | Nielsen et al. |
| 2011/0071750 A1 | 3/2011 | Giovino et al. |
| 2011/0078089 A1 | 3/2011 | Hamm et al. |
| 2011/0090075 A1 | 4/2011 | Armitage et al. |
| 2011/0090399 A1 | 4/2011 | Whitaker et al. |
| 2011/0106337 A1 | 5/2011 | Patel et al. |
| 2011/0112717 A1* | 5/2011 | Resner .................. 701/33 |
| 2011/0137489 A1 | 6/2011 | Gilleland et al. |
| 2011/0140877 A1 | 6/2011 | Gilchrist et al. |
| 2011/0143669 A1 | 6/2011 | Farrell et al. |
| 2011/0166773 A1 | 7/2011 | Raz et al. |
| 2011/0181391 A1 | 7/2011 | Chu |
| 2011/0196580 A1 | 8/2011 | Xu et al. |
| 2011/0221573 A1 | 9/2011 | Huat |
| 2011/0257880 A1 | 10/2011 | Watanabe et al. |
| 2011/0270772 A1 | 11/2011 | Hall et al. |
| 2011/0275388 A1 | 11/2011 | Haney |
| 2012/0029818 A1 | 2/2012 | Smith et al. |
| 2012/0041618 A1 | 2/2012 | Sun et al. |
| 2012/0075088 A1 | 3/2012 | Marentes Aguilar |
| 2012/0077475 A1 | 3/2012 | Holcomb et al. |
| 2012/0078497 A1 | 3/2012 | Burke, Jr. |
| 2012/0089328 A1 | 4/2012 | Ellanti et al. |
| 2012/0089686 A1 | 4/2012 | Meister |
| 2012/0106446 A1 | 5/2012 | Yousefi et al. |
| 2012/0106801 A1 | 5/2012 | Jackson |
| 2012/0123806 A1 | 5/2012 | Schumann, Jr. et al. |
| 2012/0166018 A1 | 6/2012 | Larschan et al. |
| 2012/0191329 A1 | 7/2012 | Roessle et al. |
| 2012/0197484 A1 | 8/2012 | Nath et al. |
| 2012/0218129 A1 | 8/2012 | Burns |
| 2012/0232945 A1 | 9/2012 | Tong |
| 2012/0249326 A1 | 10/2012 | Mostov |
| 2012/0252488 A1 | 10/2012 | Hartmann et al. |
| 2012/0253861 A1 | 10/2012 | Davidson et al. |
| 2012/0268260 A1 | 10/2012 | Miller et al. |
| 2012/0303237 A1 | 11/2012 | Kumar et al. |
| 2012/0323690 A1* | 12/2012 | Michael .................. G06Q 30/02 705/14.58 |
| 2012/0323767 A1 | 12/2012 | Michael |
| 2012/0323771 A1 | 12/2012 | Michael |
| 2012/0323772 A1 | 12/2012 | Michael |
| 2012/0326868 A1* | 12/2012 | Goel .................. 340/541 |
| 2013/0031318 A1 | 1/2013 | Chen et al. |
| 2013/0031345 A1 | 1/2013 | Kung |
| 2013/0035827 A1 | 2/2013 | Breed |
| 2013/0057397 A1 | 3/2013 | Cutler et al. |
| 2013/0059607 A1 | 3/2013 | Herz et al. |
| 2013/0061044 A1 | 3/2013 | Pinkus et al. |
| 2013/0066757 A1 | 3/2013 | Lovelace et al. |
| 2013/0069390 A1 | 3/2013 | Foster |
| 2013/0097458 A1 | 4/2013 | Sekino et al. |
| 2013/0100286 A1 | 4/2013 | Lao |
| 2013/0113637 A1 | 5/2013 | Sin et al. |
| 2013/0131928 A1 | 5/2013 | Bolton et al. |
| 2013/0138251 A1 | 5/2013 | Thogersen et al. |
| 2013/0144667 A1 | 6/2013 | Ehrman et al. |
| 2013/0144770 A1 | 6/2013 | Boling et al. |
| 2013/0144771 A1 | 6/2013 | Boling et al. |
| 2013/0144805 A1 | 6/2013 | Boling et al. |
| 2013/0159214 A1 | 6/2013 | Boling et al. |
| 2013/0166198 A1 | 6/2013 | Funk et al. |
| 2013/0179034 A1 | 7/2013 | Pryor |
| 2013/0185193 A1 | 7/2013 | Boling et al. |
| 2013/0185221 A1 | 7/2013 | Adams et al. |
| 2013/0218369 A1 | 8/2013 | Yoshihama et al. |
| 2013/0218461 A1 | 8/2013 | Naimark |
| 2013/0222133 A1 | 8/2013 | Schultz et al. |
| 2013/0249713 A1 | 9/2013 | Adelson |
| 2013/0250933 A1 | 9/2013 | Yousefi et al. |
| 2013/0253732 A1 | 9/2013 | Patel et al. |
| 2013/0253734 A1 | 9/2013 | Kaap et al. |
| 2013/0253754 A1 | 9/2013 | Ferguson et al. |
| 2013/0262152 A1* | 10/2013 | Collins et al. .................. 705/4 |
| 2013/0262153 A1* | 10/2013 | Collins et al. .................. 705/4 |
| 2013/0262530 A1* | 10/2013 | Collins et al. .................. 707/812 |
| 2013/0297199 A1 | 11/2013 | Kapp et al. |
| 2013/0297387 A1* | 11/2013 | Michael .................. G08G 1/0112 705/13 |
| 2013/0302757 A1 | 11/2013 | Pearlman et al. |
| 2013/0311077 A1 | 11/2013 | Ichida |
| 2013/0332070 A1 | 12/2013 | Fleizach et al. |
| 2014/0012438 A1 | 1/2014 | Shoppa et al. |
| 2014/0012510 A1 | 1/2014 | Mensinger et al. |
| 2014/0012511 A1 | 1/2014 | Mensinger et al. |
| 2014/0012634 A1 | 1/2014 | Pearlman et al. |
| 2014/0025229 A1 | 1/2014 | Levien et al. |
| 2014/0025230 A1 | 1/2014 | Levien et al. |
| 2014/0025233 A1 | 1/2014 | Levien et al. |
| 2014/0025234 A1 | 1/2014 | Levien et al. |

(56) References Cited

U.S. PATENT DOCUMENTS

| | | |
|---|---|---|
| 2014/0025235 A1 | 1/2014 | Levien et al. |
| 2014/0025236 A1 | 1/2014 | Levien et al. |
| 2014/0025284 A1 | 1/2014 | Roberts |
| 2014/0036072 A1 | 2/2014 | Lyall et al. |
| 2014/0052366 A1 | 2/2014 | Rothschild |
| 2014/0052605 A1 | 2/2014 | Beerle et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0058805 A1 | 2/2014 | Paesler et al. |
| 2014/0067160 A1 | 3/2014 | Levien et al. |
| 2014/0067167 A1 | 3/2014 | Levien et al. |
| 2014/0074692 A1 | 3/2014 | Beerle et al. |
| 2014/0077285 A1 | 3/2014 | Noda et al. |
| 2014/0077326 A1 | 3/2014 | Koshino et al. |
| 2014/0091350 A1 | 4/2014 | Katsuno et al. |
| 2014/0095061 A1 | 4/2014 | Hyde |
| 2014/0111546 A1 | 4/2014 | Utagawa |
| 2014/0119993 A1 | 5/2014 | Rhodes |
| 2014/0125500 A1 | 5/2014 | Baade |
| 2014/0125501 A1 | 5/2014 | Baade |
| 2014/0129426 A1 | 5/2014 | Lamb et al. |
| 2014/0143169 A1 | 5/2014 | Lozito |
| 2014/0147280 A1 | 5/2014 | Kowatsch |
| 2014/0157510 A1 | 6/2014 | Mjelde |
| 2014/0167821 A1 | 6/2014 | Yang et al. |
| 2014/0180567 A1 | 6/2014 | Fetsch |
| 2014/0183376 A1 | 7/2014 | Perkins |
| 2014/0195261 A1 | 7/2014 | Rasquinha et al. |
| 2014/0201064 A1 | 7/2014 | Jackson et al. |
| 2014/0210503 A1 | 7/2014 | Tam |
| 2014/0215190 A1 | 7/2014 | Mylius et al. |
| 2014/0220966 A1 | 8/2014 | Muetzel et al. |
| 2014/0267688 A1 | 9/2014 | Aich et al. |
| 2015/0006207 A1 | 1/2015 | Jarvis et al. |
| 2015/0019270 A1 | 1/2015 | Jarvis et al. |
| 2015/0024727 A1 | 1/2015 | Hale-Pletka et al. |
| 2015/0032291 A1 | 1/2015 | Lowrey et al. |
| 2015/0067312 A1 | 3/2015 | Lewandowski et al. |
| 2015/0168173 A1 | 6/2015 | Lewis-Evans et al. |
| 2015/0260529 A1 | 9/2015 | Petersen |
| 2015/0332525 A1 | 11/2015 | Harris et al. |

FOREIGN PATENT DOCUMENTS

| | | |
|---|---|---|
| CA | 2709740 A1 | 7/2009 |
| CA | 2712576 A1 | 2/2011 |
| CA | 2828835 A1 | 4/2014 |
| CA | 2832185 A1 | 5/2014 |
| CN | 2921908 Y | 7/2007 |
| CN | 101192322 A | 6/2008 |
| CN | 101240734 A | 8/2008 |
| CN | 101734228 A | 6/2010 |
| CN | 102779407 A | 11/2012 |
| CN | 103813477 A | 5/2014 |
| CN | 104931066 A | 9/2015 |
| DE | 4423328 A1 | 1/1996 |
| EP | 0096252 A2 | 12/1983 |
| EP | 0393935 A2 | 10/1990 |
| EP | 0451482 A1 | 10/1991 |
| EP | 0519630 A2 | 12/1992 |
| EP | 0744727 A2 | 11/1996 |
| EP | 0581558 B1 | 4/1997 |
| EP | 0795760 A3 | 4/1999 |
| EP | 0806632 B1 | 4/1999 |
| EP | 0660083 B1 | 9/2000 |
| EP | 0795700 B1 | 11/2001 |
| EP | 1191500 A1 | 3/2002 |
| EP | 0767448 B1 | 12/2002 |
| EP | 0785132 B1 | 5/2003 |
| EP | 1324241 A1 | 7/2003 |
| EP | 1384635 A1 | 1/2004 |
| EP | 0763713 B1 | 5/2004 |
| EP | 1752949 A1 | 2/2007 |
| EP | 1777541 A1 | 4/2007 |
| EP | 1785744 A1 | 5/2007 |
| EP | 1791101 B1 | 2/2008 |
| EP | 1912191 A1 | 4/2008 |
| EP | 1944190 A1 | 7/2008 |
| EP | 1760655 A3 | 9/2008 |
| EP | 2000889 A2 | 12/2008 |
| EP | 1870788 B1 | 10/2009 |
| EP | 1894779 B1 | 11/2009 |
| EP | 1975563 A3 | 11/2009 |
| EP | 1975565 A3 | 11/2009 |
| EP | 1804223 B1 | 12/2009 |
| EP | 1927961 B1 | 1/2010 |
| EP | 2154026 A1 | 2/2010 |
| EP | 2339562 A1 | 6/2011 |
| EP | 2418461 A1 | 2/2012 |
| EP | 2528043 A1 | 11/2012 |
| EP | 1975566 A3 | 12/2012 |
| EP | 1742083 B1 | 1/2013 |
| EP | 1895273 A3 | 1/2013 |
| EP | 2747004 A1 | 6/2014 |
| JP | 2006123891 A | 5/2006 |
| JP | 2014170000 A | 9/2014 |
| WO | 8401823 A1 | 5/1984 |
| WO | 9834314 A1 | 8/1998 |
| WO | 9963357 A1 | 12/1999 |
| WO | 0070530 A1 | 11/2000 |
| WO | 0124393 A1 | 4/2001 |
| WO | 0159601 A1 | 8/2001 |
| WO | 0175472 A2 | 10/2001 |
| WO | 0219683 A1 | 3/2002 |
| WO | 02089077 A1 | 11/2002 |
| WO | 03012473 A1 | 2/2003 |
| WO | 03034089 A2 | 4/2003 |
| WO | 03036462 A1 | 5/2003 |
| WO | 03079717 A2 | 9/2003 |
| WO | 2004009473 A1 | 1/2004 |
| WO | 2004051594 A2 | 6/2004 |
| WO | 2004075090 A1 | 9/2004 |
| WO | 2004086076 A2 | 10/2004 |
| WO | 2004102536 A2 | 11/2004 |
| WO | 2005008603 A1 | 1/2005 |
| WO | 2006053566 A1 | 5/2006 |
| WO | 2008034097 A2 | 3/2008 |
| WO | 2008118578 A2 | 10/2008 |
| WO | 2008141456 A1 | 11/2008 |
| WO | 2009058972 A2 | 5/2009 |
| WO | 2009080070 A1 | 7/2009 |
| WO | 2009097595 A1 | 8/2009 |
| WO | 2009112305 A1 | 9/2009 |
| WO | 2009158469 A1 | 12/2009 |
| WO | 2011011544 A1 | 1/2011 |
| WO | 2011037766 A2 | 3/2011 |
| WO | 2011037800 A2 | 3/2011 |
| WO | 2011070534 A2 | 6/2011 |
| WO | 2013016581 A1 | 1/2013 |
| WO | 2014008752 A1 | 1/2014 |
| WO | 2014062668 A1 | 4/2014 |

OTHER PUBLICATIONS

"Sensor-based Logistics: Monitoring Shipment Vital Signs in Real Time", Inbound Logistics, Jun. 2013 by Chris Swearingen (pp. 2) http://www.inboundlogistics.com/cms/article/sensor-based-logistics-monitoring-shipment-vital-signs-in-real-time/.

"Electronic Cargo Tracking System and Solution, Intermodal Real-time Container Tracking and Rail Car Transport Security Tracking System for End-to-End Supply Chain Security System and Tracking Solution", Cargo Tracking Solution & intermodal Transport Monitoring, Avante International Technology, Inc. in 2001-2015 (pp. 11) http://www.avantetech.com/products/shipping/.

"Sea Container Tracking Methods", Moving-Australia, 2012 (pp. 3) http://www.moving-australia.co.uk/container/tracking-methods.php.

"GlobalTag for Global Visibility and Tracking", Global Tracking Technology, in 2015 (pp. 5) http://globaltrackingtechnology.com/globaltag-for-global-visibility.html.

(56) References Cited

OTHER PUBLICATIONS

"The Course of the 'Connected' Car", It Is Innovation, Emphasis on safety, Jan. 6, 2013 by Murray Slovick (pp. 4) http://www.ce.org/i3/Features/2013/January-February/The-Course-of-the-Connected-car.aspx.

"Cooperating Embedded Systems and Wireless Sensor Networks", John Wiley & Sons, Inc., ISBN: 978-1-84821-000-4, Mar. 10, 2008 by Michel Banâtre et al. (pp. 2) http://as.wiley.com/WileyCDA/WileyTitle/productCd-1848210000.html.

"Mitsubishi Motors Develops New Driver Support System", Mitsubishi Motors, Dec. 15, 1998 (pp. 5) http://www.mitsubishi-motors.com/en/corporate/pressrelease/corporate/detail429.html.

"Vehicle Tracking for an Evasive Manoeuvres Assistant Using Low-Cost Ultrasonic Sensors", EBSCO Host Connections, 2014, vol. 14 Issue 12, p. 22689, Dec. 2014 by Jiménez, Felipe et al. (p. 1) http://connection.ebscohost.com/c/articles/100145890/vehicle-tracking-evasive-manoeuvres-assistant-using-low-cost-ultrasonic-sensors.

"The End of Demographics: How Marketers Are Going Deeper With Personal Data", Mashable Journal, in Jul. 1, 2011 by Jamie Beckland (pp. 7) http://mashable.com/2011/06/30/psychographics-marketing/.

"Power cycling 101: Optimizing energy use in advanced sensor products", Analog Dialogue, vol. 44, Aug. 2010 by Mark Looney (pp. 7) http://www.analog.com/library/analogdialogue/archives/44-08/power_cycling.html.

"Dynamic Vehicle Detection Via the Use of Magnetic Field Sensors", MDPI, Jan. 19, 2016 by Vytautas Markevicius et al. (pp. 9) http://www.mdpi.com/1424-8220/16/1/78/pdf.

"Accuracy and Resource Consumption in Tracking and Location Prediction", 8th International Symposium, Jul. 2003 by Ouri Wolfson et al. (pp. 4) http://link.springer.com/chapter/10.1007/978-3-540-45072-6_19.

"A Heuristic Moving Vehicle Location Prediction Technique Via Optimal Paths Selection With Aid of Genetic Algorithm and Feed Forward Back Propagation Neural Network", Journal of Computer Science, Dec. 12, 2012 by Baby Anitha, E. et al. (pp. 9) http://citeseerx.ist.psu.edu/viewdoc/download?doi=10.1.1.687.3596&rep=rep1&type=pdf.

"Location Estimation and Trajectory Prediction of Moving Lateral Vehicle Using Two Wheel Shapes Information in 2-D Lateral Vehicle Images by 3-D Computer Vision Techniques", IEEE Xplore, Sep. 14-19, 2003 by Chih-Chiun Lai et al. (p.1) http://ieeexplore.ieee.org/xpl/articleDetails.jsp?arnumber=1241704.

"Adaptive Location Prediction Strategies on a Hierarchical Network Model in a Cellular Mobile Environment", The Computer Journal, May 1999 by Sajal K. Das et al. (p. 1) https://goo.gl/C27yaT "Automatic Transit Tracking, Mapping, and Arrival Time Prediction Using Smartphones", ACM Digital Library, Nov. 1-4, 2011 by James Biagioni et al. (pp. 14) https://www.cs.uic.edu/~jakob/papers/easytracker-sensys11.pdf.

"Location Prediction and Queries for Tracking Moving Objects", IEEE Xplore, 2000 by O. Wolfson et al. (p. 1) http://ieeexplore.ieee.org/xpl/articleDetails.jsp?arnumber=839495.

"A Novel Vehicular Location Prediction Based on Mobility Patterns for Routing in Urban VANET", EURASIP Journal on Wireless Communications and Networking, Dec. 2012 by Guangtao Xue et al. (pp. 28) http://link.springer.com/article/10.1186/1687-1499-2012-222.

"Vision-Based Vehicle Detection System With Consideration of the Detecting Location", IEEE Xplore, Apr. 3, 2012 by Minkyu Cheon et al. (p. 1) http://ieeexplore.ieee.org/xpl/articleDetails.jsp?arnumber=6175131.

"A Vehicle Detection Approach Based on Multi-Features Fusion in the Fisheye Images", IEEE Xplore, Mar. 11-13, 2011 by Guangtao Cheng et al. (p. 1) http://ieeexplore.ieee.org/xpl/articleDetails.jsp?arnumber=5763840.

* cited by examiner

Figure 1:
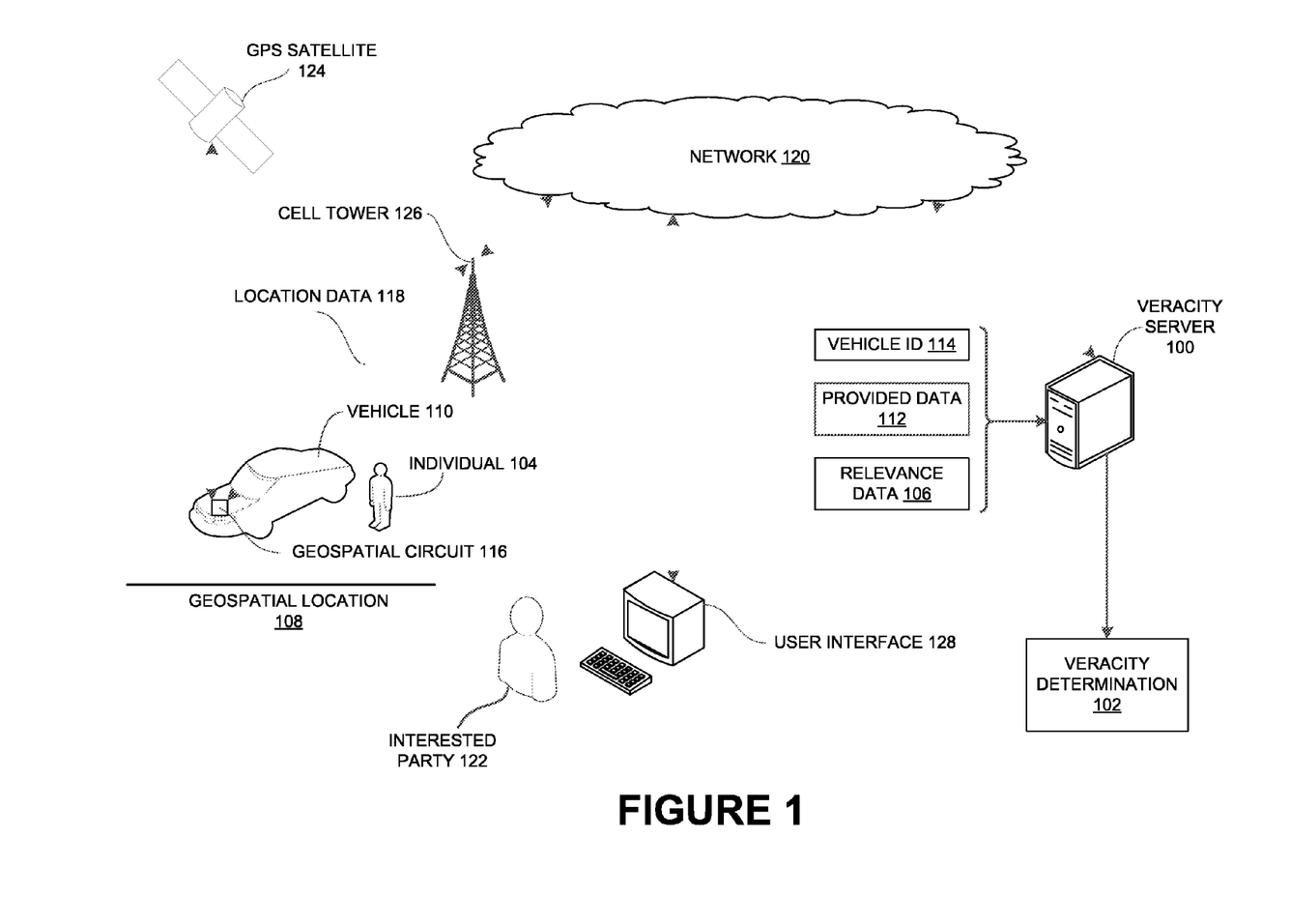

VERACITY DETERMINATION THROUGH COMPARISON OF A GEOSPATIAL LOCATION OF A VEHICLE WITH A PROVIDED DATA

FIELD OF TECHNOLOGY

This disclosure relates generally to the technical field of veracity determination, and in one example embodiment, this disclosure relates to a method and system of determining truthfulness of a provided data of an individual through a comparison of a geospatial location of a vehicle with the provided data.

BACKGROUND

An individual may submit an information to an organization (e.g., a financial institution, a judge, a police officer, etc.) to seek an approval from the organization that will benefit the individual. For example, the individual may not know a correct address of a reference and/or an employer when submitting the information to the organization. Other times, the individual may wish to conceal information from the organization in an effort to influence a decision that the organization may be requested to make prior to the approval that will benefit the individual.

The organization may provide the approval (e.g., a loan, a parole, a conditional release) in detrimental reliance on an assurance provided by the individual when providing the information. After the approval, the organization may consult public sources to determine if the information provided by the individual is truthful. However, public sources may not confirm the information provided by the individual is truthful.

Confirming the truthfulness of the information provided by the individual may prove time consuming and/or dangerous in an event that the organization has to take measures to visually verify an association of an address with the individual (e.g., a place of employment, a place of residence, etc.). This can be cost prohibitive. Therefore the organization may be defrauded when the individual fails to be verified as having submitted truthful information to the organization.

SUMMARY

Disclosed are a method, system and apparatus related to veracity determination through comparison of a geospatial location data of a vehicle.

In one aspect, a method of a veracity server includes associating a provided data of an individual with a vehicle by a processor communicatively coupled to a machine-readable memory. The method also includes determining a geospatial location of the vehicle by a geospatial circuit hidden in the vehicle and disclosed to the individual. Further, the method includes correlating, by the processor, a relevance of the geospatial location of the vehicle with the provided data. Furthermore, the method of the processor includes determining a veracity of the provided data based on a history of vehicle occurrences at the geospatial locations and the relevance of the geospatial locations with the provided data.

According to another aspect, a veracity server involves a storage having a provided data of an individual and an identification information of a vehicle. Also, the veracity server involves a geospatial circuit to determine a geospatial location of the vehicle. Further, the veracity server involves a machine-readable memory to correlate a relevance of a geospatial location of the vehicle with the provided data. A processor to determine a veracity of the provided data based on the relevance of the geospatial location of the vehicle with the provided data may also be involved.

In another aspect, a system includes a veracity server to determine a geospatial location of a vehicle by a geospatial circuit. The veracity server also to correlate a relevance of the geospatial location with a provided data and to determine a veracity of an individual based on a relevance of the geospatial location to the provided data. Further, the system includes a vehicle to provide a geospatial location associated with the individual to the veracity server. Furthermore, the system includes a storage to hold vehicle identification and provided data from the individual.

The methods, system, and/or apparatuses disclosed herein may be implemented in any means for achieving various aspects, and may be executed in a form of machine readable medium embodying a set of instruction that, when executed by a machine, causes the machine to perform any of the operation disclosed herein. Other features will be apparent from the accompanying drawing and from the detailed description that follows.

BRIEF DESCRIPTION OF DRAWINGS

Example embodiments are illustrated by way of example and not limitation in the figures of the accompanying drawing, in which like references indicate similar elements and in which:

FIG. 1 is an overview illustrating a veracity server that involves a vehicle, an individual, a geospatial circuit, an interested party, and a provided data, according to one embodiment.

FIG. 2 depicts a chart comprising a plurality of provided data of FIG. 1, according to one embodiment;

FIG. 3 is schematic view illustrating the hardware that may comprise the veracity server of FIG. 1, according to one embodiment.

FIG. 4 is a time lapse diagram depicting the geospatial circuit within the vehicle gathering a location data of the vehicle at three different times throughout a day, wherein the location data is a proximity data, a duration data, a frequency data, and a stop time data, according to one embodiment.

FIG. 5 depicts three different exemplary scenarios of a location data history of the vehicle being stationary at different locations of the provided data, according to one embodiment.

FIG. 6 comprises a validation condition table and a message containing a veracity determination delivered to the individual.

Other features of the present embodiments will be apparent from the accompanying drawings and from the detailed description that follows.

DETAILED DESCRIPTION

Example embodiments, as described below, relate to a method, an apparatus and a system related of veracity determination through comparison of a geospatial location data of a vehicle with a provided data, according to one or more embodiments.

FIG. 1 is an overview of a veracity server 100 that may be used to determine a veracity 102 of a provided data 112 (e.g., names of references, residence address, employer addresses, reference addresses) of an individual 104 (e.g., parolee, sub-prime automotive loan applicant). Veracity determination 102 may be based on a relevance data 106 (e.g., location proximity, vehicle stoppage frequency, time of vehicle stoppage) of a geospatial location 108 (e.g., any place where vehicle becomes stationary) of a vehicle 110 (e.g., vehicle owned by parolee, vehicle purchased on credit) with the provided data 112. The individual 104 may voluntarily offer the provided data 112 to comply with an organization (e.g., parole officer, sub-prime automotive lender, employer). A vehicle identification information (vehicle ID) 114 (e.g., vehicle make and model, license plate, registration information, vehicle identification number (VIN)) corresponding to vehicle 110 may also be provided by the individual and/or may be known by the veracity server 100 (e.g., automotive lender owns vehicles for sale, car rental lot).

In one exemplary embodiment, the individual 104 provides information (e.g., accurate and/or current addresses of references, truthful residence addresses, veracity of reference personnel, current place of employment) in a provided data 112. Further, the individual 104 may be associated with a vehicle 110 at a geospatial location 108. The geospatial location 108 may be considered as a location wherein the vehicle 110 becomes stationary.

In another embodiment of the veracity server 100 in FIG. 1, a Global Positioning Satellite (GPS) 124 may determine the geospatial location 108 of the vehicle 110 through a communication (e.g., National Marine Electronics Association (NMEA) 0183, GPS communication protocols) with a geospatial circuit 116 (e.g., global positioning satellite device). The geospatial circuit 116 may reside in the vehicle 110 and may periodically transmit a location data 118. For example, the location data 118 may comprise information of and/or related to an extended vehicle stoppage, a location of a vehicle stoppage, a duration of a vehicle stoppage, a proximity of vehicle location to a predetermined location, and/or a time of vehicle stoppage, according to one embodiment.

In one embodiment, the geospatial circuit 116 may include an antenna to enable wireless communication to the veracity server 100 via a cell tower 126 and/or network 120. For example, the geospatial circuit 116 may include cellular communication protocols such as Global System for Mobile communications (GSM), Code Division Multiple Access (CDMA), and/or Wi-Fi. Further, the network 120 may be a WLAN, WMAN, WAN, 3G, and/or 4G.

Additionally, an interested party 122 (e.g. sub-prime auto lender, parole officer, etc.) may dictate the relevance data 106 to the veracity server 100 to be considered in the veracity determination 102 of the provided data 112. Furthermore, the interested party 122 may rely on personal discretion to decide to configure relevance data 106 specific to each individual 104 (i.e., strict or lenient criteria may be applied on an individual basis), according to one embodiment.

In another embodiment, the veracity server 100 may be used to determine the veracity 102 of the provided data 112 based on the relevance data 106 of multiple geospatial locations 108 (i.e., many locations may be used in an evaluation) of the vehicle 110. In another such embodiment, the veracity server 100 may be used to determine the veracity 102 of multiple sets of provided data 112 based on multiple geospatial locations 108 of multiple vehicles 110 (i.e., multiple sets of provided data corresponding to different people may be evaluated simultaneously).

FIG. 1 depicts an operational state that the veracity server 100 may embody. The veracity server 100 may receive inputs from the interested party 122, the individuals 104, as well as location data 118 from the respective geospatial circuits 116 (i.e., the geospatial circuits of the multiple vehicles of potentially truthful and/or fraudulent individuals.) In one embodiment, the veracity server 100 may provide an output of the veracity determination 102 according to an analysis of the location data 118 and/or the provided data 112.

Important to FIG. 1, is how the veracity server 100 interfaces with the external environment, namely with any number of vehicles 110 and a variety of geospatial locations 108 that each vehicle 110 may occupy at any given point in time. Also, FIG. 1 shows that the veracity server 100 stores a static data (e.g. provided data 112 and vehicle identification 114), receives dynamic data (e.g. location data 118), and uses both data types in determining the veracity 102 of the provided data 112 associated with individual 104 and/or the vehicle 110.

Further, FIG. 1 depicts a user interface 128 (e.g., a software module for a data processing device, a mobile smartphone application) for the interested party 122 to configure the relevance data 106 and/or manage a portfolio of provided data 112, according to one embodiment. The user interface 128 may be communicatively coupled to the veracity server 100, according to one embodiment.

Figure 2:
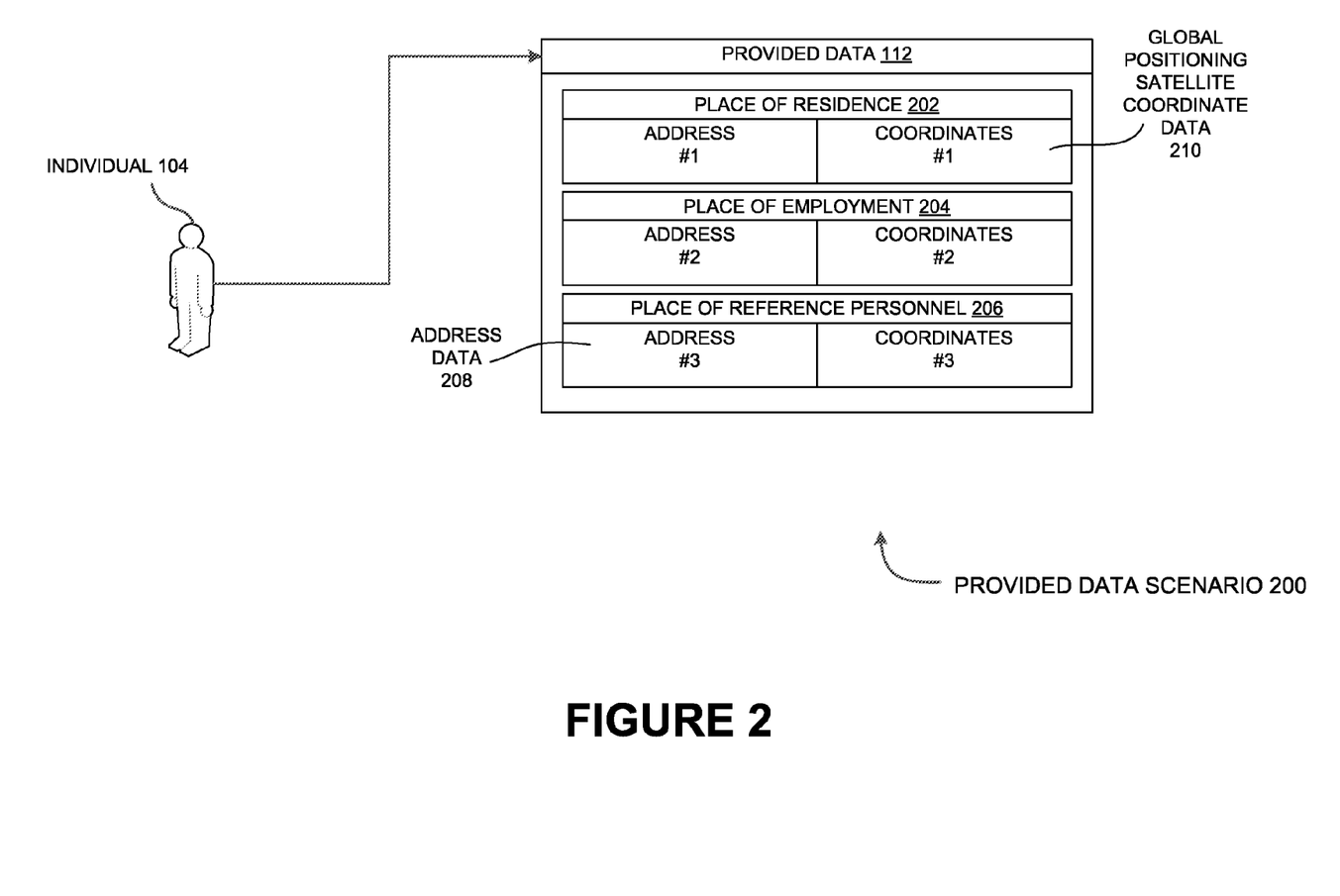

FIG. 2 is a chart diagram of an example embodiment of provided data 112. In provided data scenario 200, the provided data 112 comprises a place of residence 202, a place of employment 204, and a place of reference personnel 206. In one embodiment, provided data scenario 200 may comprise a truthful embodiment. For example, a borrower may provide accurate and truthful information on an automotive loan application. Or, in a fraudulent embodiment, a borrower may provide inaccurate information such as wrong addresses and/or wrong persons of contact. Each of the provided data 112 may comprise one of an address data 208, a global positioning satellite coordinate data 210, and/or a person of contact, as depicted by FIG. 2.

In another embodiment, the provided data 112 of FIG. 2 may include at least a plurality of personal address data (e.g., place of residence 202 and/or place of employment 204) and reference personnel data (e.g., place of reference personnel 206). Additionally, the provided data 112 may comprise a plurality number of personal address data and reference personnel data that may be truthful, fraudulent, and/or inaccurate. Furthermore, the interested party 122 may decide how many of the personal address data and the reference personnel data may be required in a combination to comprise the provided data 112. Each combination of provided data 112 may be specific to each individual 104, according to one embodiment.

Important of FIG. 2, is the fact that the extent of the truthfulness, fraudulence, and/or accuracy of the provided data 112 may not be known by the veracity server 100 at a time of initial data entry. For example, the borrower provides address data 208 on an auto-loan application and the lender may enter any provided data 112 into the veracity server 100 in order to determine a validity of the provided data 112. At the time of a sale and/or a loan agreement between the lender and the borrower, the lender may be unable to determine the validity of the provided data 112. FIG. 2 shows how the veracity server 100 may be acted upon by a variety of individuals 104 with a variety of personal intentions regarding the accuracy of the provided data 112. For example, the individual 104 may be unemployed and thus may provide a false place of employment 204 on an auto-loan application. In a later stage of the veracity server 100, the veracity determination 102 may become possible through an evaluation of the provided data 112 with the location data 118 collected over a period of time, among other considerations, according to one embodiment.

Figure 3:
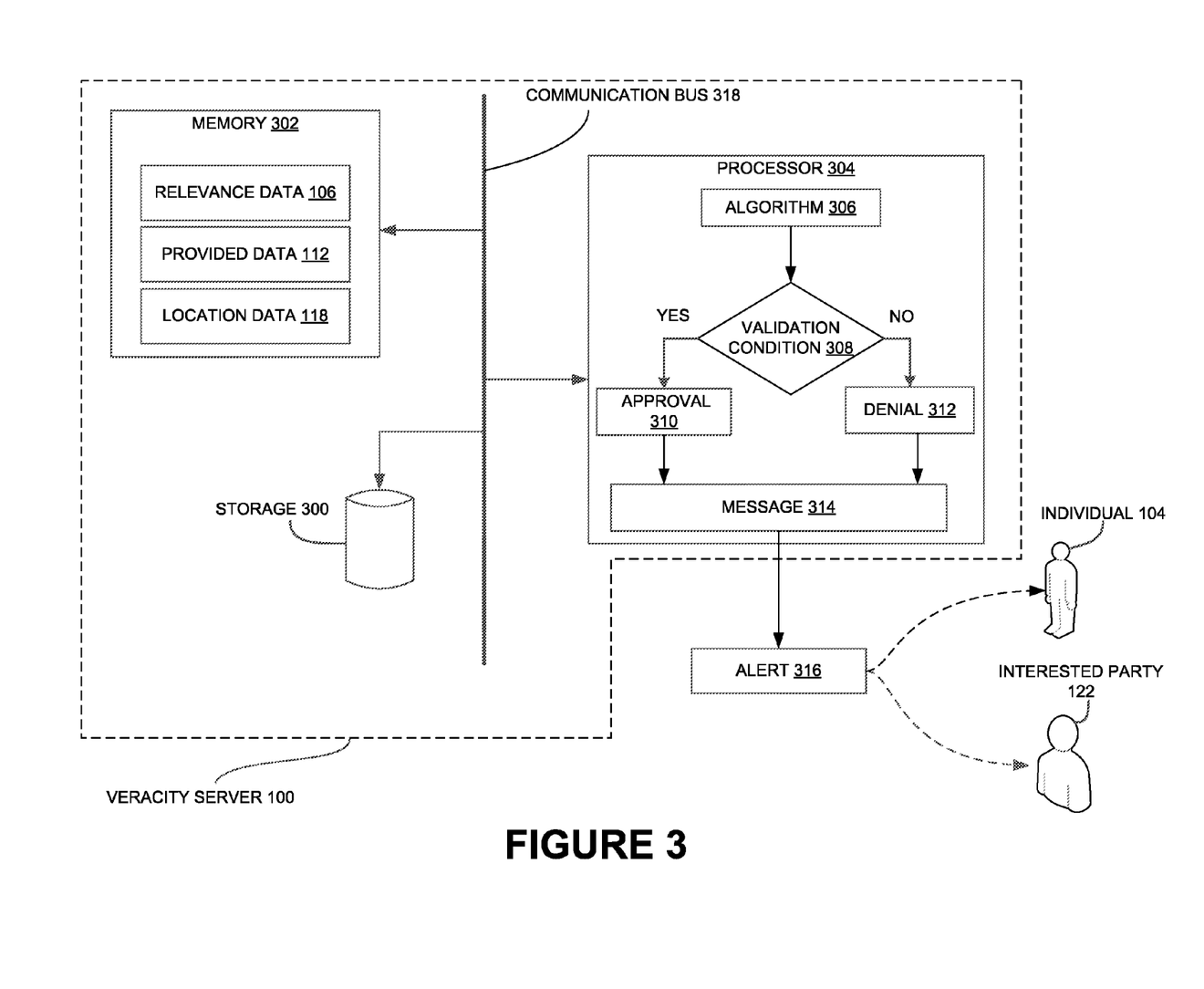

FIG. 3 is a schematic of the minimum hardware that may comprise the veracity server 100, namely a storage 300, a memory 302, and a processor 304. In one such embodiment, the storage 300 having the provided data 112 of individual 104 and the vehicle ID 114 of the vehicle 110 loads the memory 302 to correlate the relevance data 106 of a geospatial location 108 of the vehicle 110 with the provided data 112. As previously disclosed, the relevance data 106 may be configured by the interested party 122, the location data 118 may be transmitted from the geospatial circuit 116 through the network 120 to the veracity server 100, and the provided data 112 may be provided by the individual 104.

Further, the processor 304 may be used to determine the veracity 102 of the provided data 112 based on the relevance data 106 of the geospatial location 108 of the vehicle 110 with the location data 118. In one particular embodiment, the processor 304 may comprise an algorithm 306 to correlate the data loaded into the memory 302 in order to meet a validation condition 308 (e.g., number of truthful provided data 112 required).

In one embodiment, the validation condition 308 may be satisfied and the processor 304 of veracity server 100 may further determine an approval 310 of the provided data 112. Further, upon approval 310, the veracity server 100 may generate an alert 316 (e.g., email, pop-up message on a smartphone, Short Message Service (SMS) text message, phone call) to at least one of the individual 104 and the interested party 122, wherein the alert 316 may comprise a message 314 that informs of the validation condition 308 being satisfied. In another embodiment where the validation condition 308 may not be satisfied, the processor 304 of veracity server 100 may determine a denial 312 of the provided data 112. Furthermore, upon denial 312, the veracity server 100 may generate alert 316 to the individual 104 and/or the interested party 122, wherein the alert 316 may comprise the message 314 that informs of the validation condition 308 being violated based on the provided data 112.

FIG. 3 most importantly displays how each of the external elements of the veracity server 100 (e.g., interested party 122, individual 104) may interact with the internal hardware in order to provide an output of the veracity determination 102. Also, the approval 310/denial 312 processes disclosed in FIG. 3 demonstrates how one particular embodiment of the veracity server 100 may be used to output information (e.g., messages, alerts, status updates). Furthermore, in FIG. 3, the memory 302 may use a software module wherein the relevance data 106 may become configurable by the interested party 122 and through the user interface 128, according to one embodiment.

Figure 4:
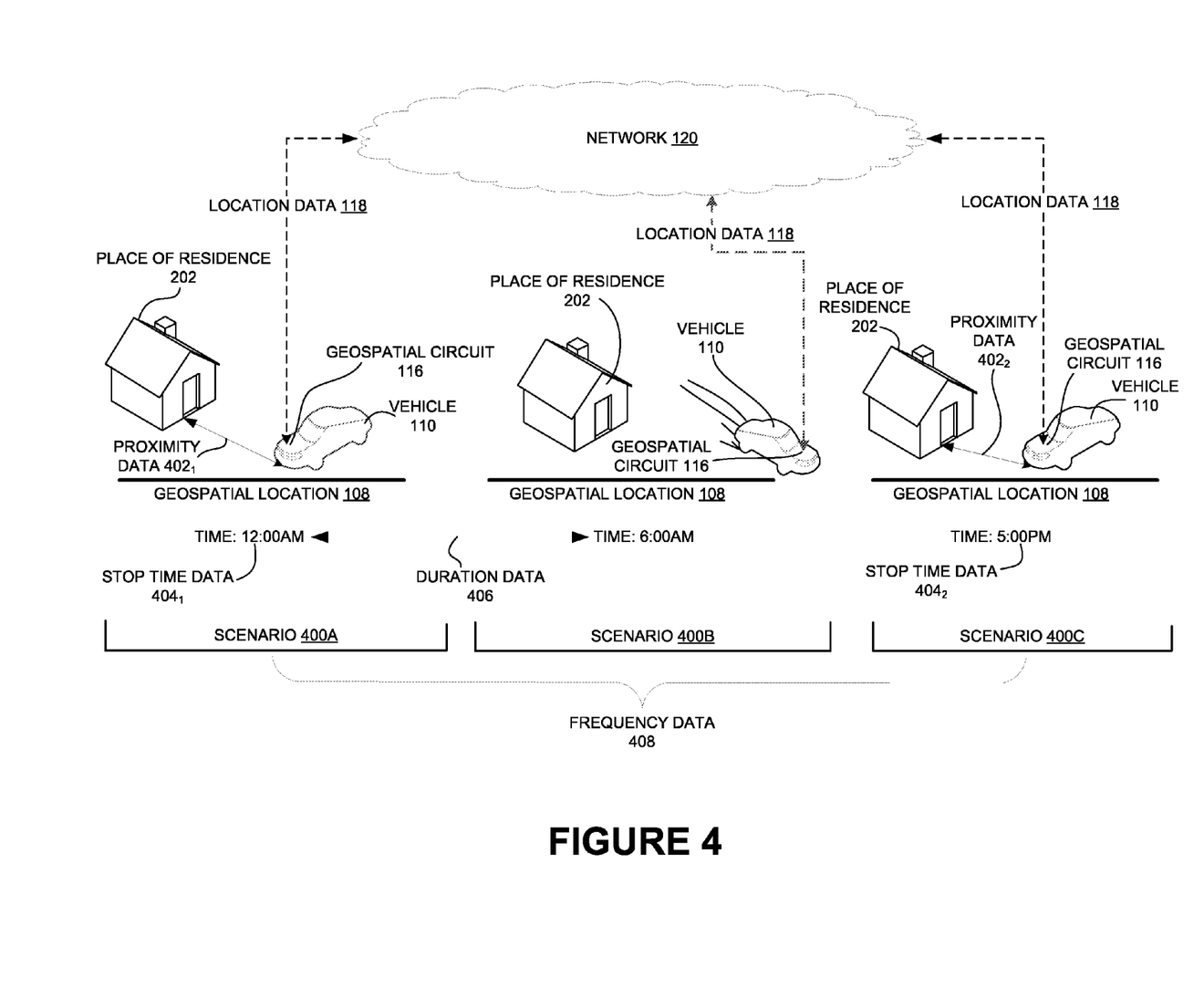

FIG. 4 depicts a hypothetical scenario 400 in three different states of an elapsed time period. In one embodiment of the veracity server 100, the geospatial location 108 of the vehicle 110 may be determined based on the geo spatial circuit 116 placed with the vehicle 110 that periodically transmits information to the veracity server 100 via network 120, wherein the transmitted information comprises the location data 118. In one such embodiment of the veracity server 100, the location data 118 may comprise at least one of a proximity data $402_{1-N}$ (e.g., closeness of the vehicle stoppage relative to a known address), a stop time data $404_{1-N}$, a duration data 406, and/or a frequency data 408 (e.g., number of occurrences at a given location). The location data 118 may be relative to the vehicle 110 and the geospatial location(s) 108 of the stationary states, wherein the location data 118 may be recorded and/or transmitted by the geospatial circuit 116, according to one embodiment.

According to another embodiment, scenario 400A occurs at a stop time data $404_1$ (12:00 AM). FIG. 4 indicates the proximity data $402_1$ as being the distance between vehicle 110 and the place of residence 202 when the vehicle 110 has become stationary at stop time data $404_1$, according to one embodiment. In another such embodiment, scenario 400B occurring at 6:00 AM, the state of the vehicle 110 has changed from stationary to mobile (e.g., individual 104 leaves residence in vehicle 110 headed to place of employment). A change in the state of motion of vehicle 110 yields a duration data 406, comprising the total time that has elapsed while the vehicle 110 was in a stationary state at the geospatial location 108 of the place of residence 202. According to the final embodiment of FIG. 4, scenario 400C occurring at 5:00 PM, the vehicle 110 becomes stationary at place of residence 202 once again, generating both a new stop time data $404_2$ and a new proximity data $402_2$. An additional frequency data 408 which may comprise the number of vehicle 110 occurrences at a given geospatial location 108 may also be recorded and transmitted in scenario 400C.

The geospatial circuit 116 accomplishes the transmission of location data 118 wherein the location data 118 may comprise at least any number and/or any combination of the data disclosed above, according to one embodiment. Further, the geospatial circuit 116 may transmit location data 118 at a frequency desired by the interested party 122. Furthermore, the location data 118 may comprise the geospatial location 108 of vehicle 110 with respect to any of the provided data 112 and/or may be associated with the vehicle 110, according to one embodiment.

FIG. 4 demonstrates how the geospatial circuit 116 may be utilized by the veracity server 100 to gather location data 118 from the environment of the vehicle 110, according to one embodiment. Another embodiment of the veracity server 100 may comprise a single transmission of location data 118 of each of the distinct types presented in FIG. 4. It will be appreciated that the depicted embodiment of FIG. 4 may be considered as only one of a plurality of possible embodiments of the veracity server 100 and the location data 118.

Further, a tolerance threshold of each type of the location data 118 may be configured by the interested party 122 through the user interface 128, according to one embodiment. According to one embodiment, the relevance data 106 may comprise a plurality of tolerance thresholds in order to determine how relevant a quality of the location data 118 may be in validating the provided data 112.

Figure 5:
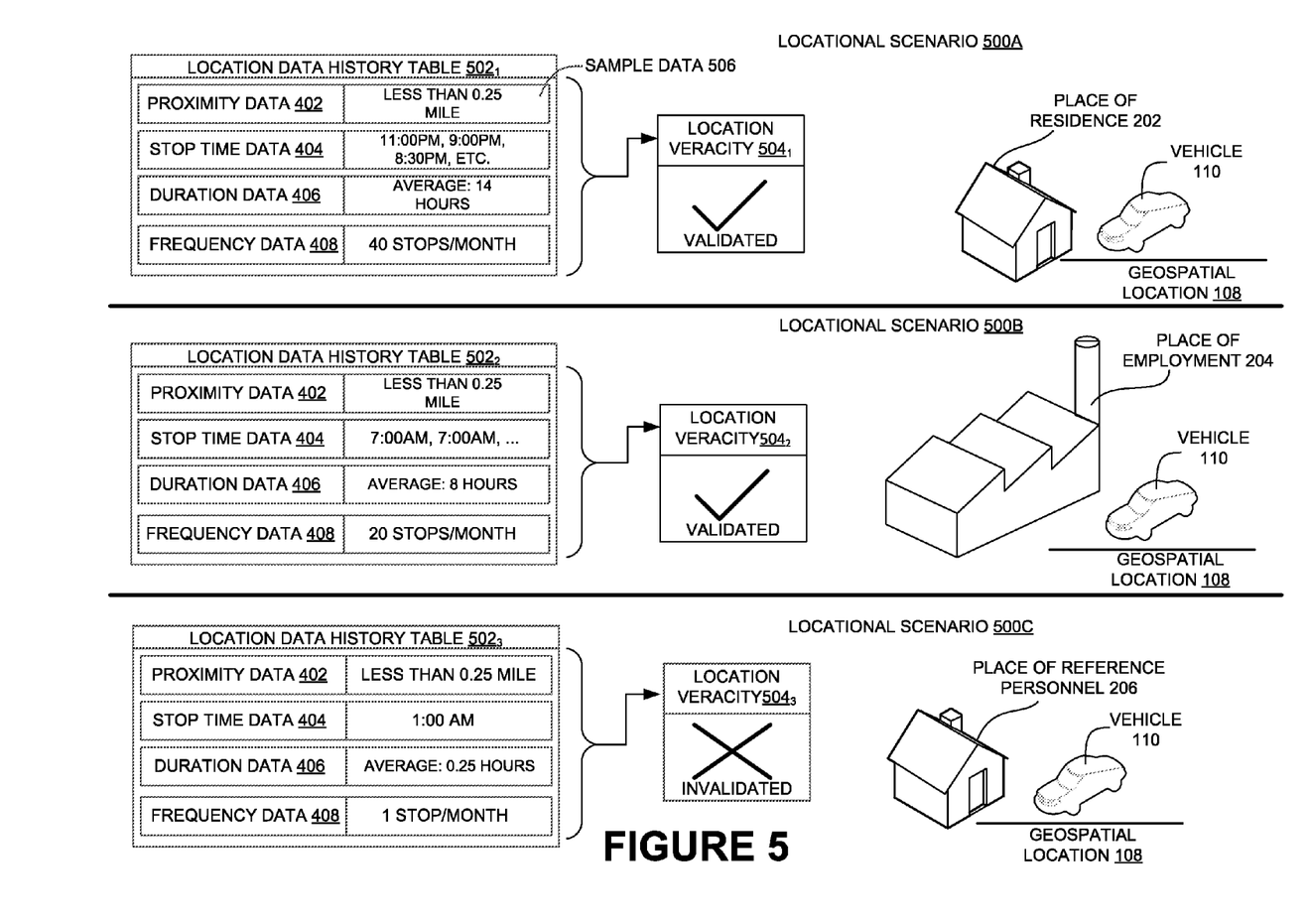

FIG. 5 demonstrates three hypothetical embodiments of the veracity server 100 and of the location data 118, wherein locational scenarios 500A, 500B, and 500C are example embodiments of the previously disclosed provided data scenario 200 of FIG. 2. Additionally, included in each scenario is a location data history table 502 which comprises an exemplary proximity data $402_{1-N}$, stop time data $404_{1-N}$, duration data 406, and frequency data 408. Further, a location veracity 504 is depicted with respect to each location and the nature of the location data history table 502.

In one such embodiment, locational scenario 500A shows vehicle 110 at the geospatial location $108_1$ of the place of residence 202, which may be disclosed in provided data 112. According to this embodiment, the location data history table $502_1$ displays a hypothetical cumulative history of the vehicle 110 at geospatial location $108_1$, in terms of the location data 118. The left column of table 502 comprises the type of location data 118, according to one embodiment. The right column of table 502 is an example of the location data 118 accumulated over time at the depicted geospatial location 108, according to one embodiment.

For example, in location data history table $502_1$, the duration data 406 of the vehicle 110 at this location reads "AVERAGE: 14 hours". In one embodiment of veracity server 100, an average of the durations of time elapsed while the vehicle 110 resides stationary may be utilized to determine the location veracity $504_1$ based on the relevance data 106. The place of residence 202 may be found truthful since the vehicle 110 spends large amounts of time on average at the geospatial location $108_1$ of the place of residence 202 in the provided data 112.

In another example of the location data history table $502_1$, the frequency data 408 displays a sample of "40 stops per month" corresponding to the number of occurrences of vehicle 110 at geospatial location 108. Additionally indicated by the location data history table $502_1$, are a proximity data $402_{1-N}$ of "Less than ¼ mile" and a stop time data $404_{1-N}$ with multiple stop times indicated. In the example embodiment of locational scenario 500A, the veracity server 100 determines that the location data 118 comprising the location data history table $502_1$ strongly corresponds to the place of residence 202. Thus, the veracity of the provided data 112 may be validated in regards to the place of residence 202 of the provided data 112.

In another embodiment, locational scenario 500B depicts the vehicle 110 at the place of employment 204 that may be in the provided data 112 of the individual 104. The location data history table $502_2$ is structured in the same way as $502_1$ and displays resultant location data 118 in regards to vehicle 110 being at the geospatial location $108_2$ of the place of employment 204, which may be disclosed in the provided data 112. Upon an examination of the results in table $502_2$, the location history of vehicle 110 likely corresponds to that of a truthful place of employment 204 (e.g., see $502_2$, stop time data 404 and frequency data 408). Thus, in an exemplary embodiment such as locational scenario 500B, the veracity server 100 determines that the location data 118 of the vehicle 110 corresponds to the place of employment 204. Thus, the veracity of the provided data 112 may be validated in regards to this particular aspect of the provided data 112.

In another embodiment of FIG. 5, locational scenario 500C depicts the vehicle 110 at the place of reference personnel 206 that may be in the provided data 112 of the individual 104. The location data history table $502_3$ is structured in the same way as $502_1$ and displays location data results in regards to vehicle 110 being at the geospatial location $108_3$ of the place of reference personnel 206. Upon an examination of the results in table $502_3$, the location history of vehicle 110 does not suggest that the place of reference personnel 206 conclusively corresponds to a strong reference address. For example, frequency data 408 indicates that the vehicle only visited geospatial location $108_3$ only once during the span of one year. Further, the stop time data 404 indicates that the vehicle visited at 1:00 AM. Each of these characteristics indicate that the place of reference personnel 206 may not be an acceptable location of reference to the interested party 122. Thus, in an example embodiment such as locational scenario 500C, the veracity server 100 determines that the location data 118 of the vehicle 110 corresponds to the place of reference personnel 206. Thus, the locational veracity $504_3$ of the place of reference personnel 206 may be invalidated in regards to this particular aspect of the provided data 112.

The exemplary embodiments of FIG. 5 may be considered as embodiments wherein the provided data 112 may be mostly truthful and/or accurate. However, it may be appreciated that the veracity server 100 may function accordingly in an embodiment where the individual 104 has provided false information and/or inaccurate information. For example, if the individual 104 provided a false place of employment 204, the location data history table 502 may conclude that the pertaining information is false based on location data 118 accumulated over a period of time, according to one embodiment. Or, if the borrower provides a false place of residence 202 on an auto-loan application in an attempt to mislead the lender, then the veracity server 100 may conclude that the vehicle 110 never visits the geospatial location 108 of the indicated place of residence 202. Thus, in a likewise manner to the previously disclosed embodiments, the location veracity 504 may be invalidated. Further, in embodiments such as the previously disclosed embodiments of FIG. 5 or in embodiments where the vehicle 110 does not correspond to the geospatial locations 108 of the provide data 112, the veracity server 100 may be able to determine which geospatial locations 108 of the provided data 112 are valid.

Figure 6:
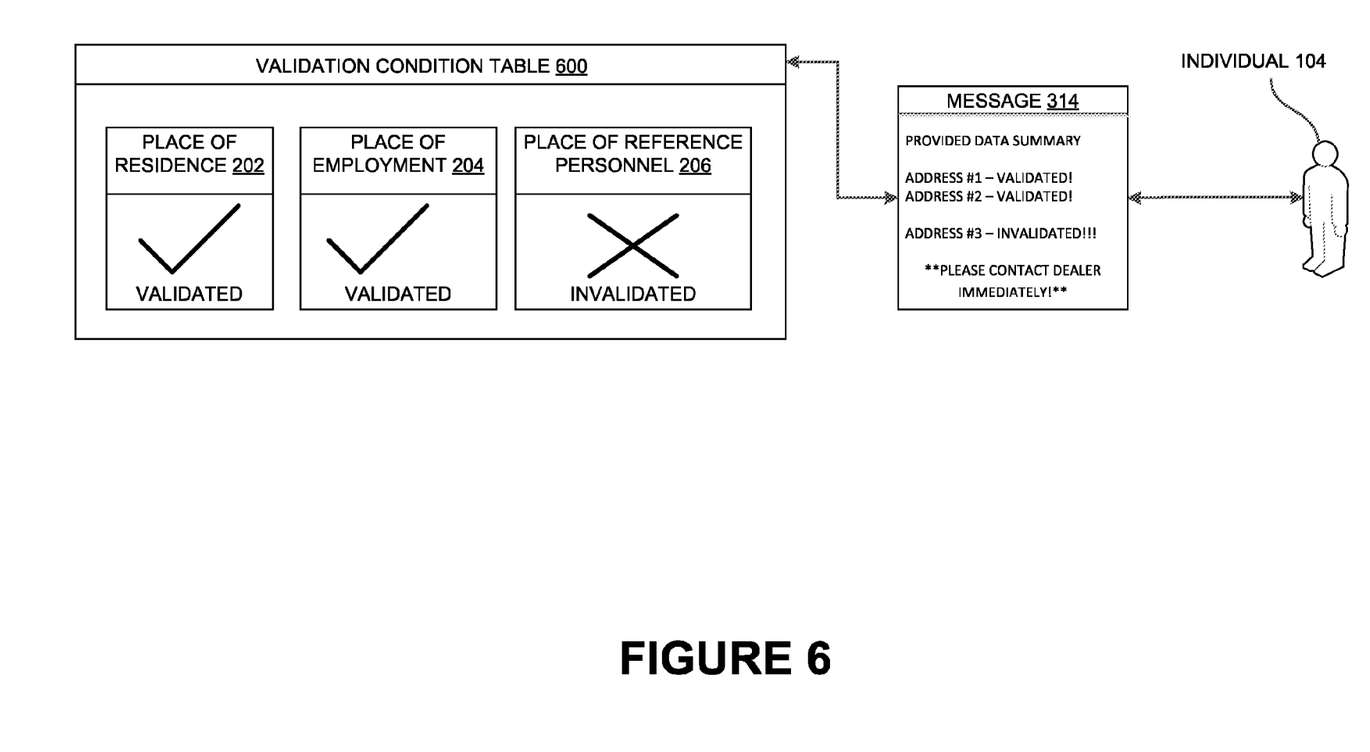

FIG. 6 depicts a validation condition table 600 that refers to the previously disclosed embodiments of FIG. 5. In one embodiment, the validation condition table 600 comprises the location veracity 504 of each of the locational scenarios 500 of FIG. 5. According to one embodiment, validation condition table 600 may be used by the processor 304 to generate the message 314 based on the concluded location veracity 504 of each of the locations of the provided data 112. The message 314 may communicate the results of the veracity sever 100 to the individual 104. The individual 104 may be instructed to contact the lender immediately and/or may be notified of validated addresses of provided data 112. In another embodiment, the message 314 may also be delivered to the interested party 122.

In another embodiment, the number of validated locations 504 of the provided data 112 that are required for approval 310 may be determined at the discretion of the interested party 122. For example, the interested party 122 may determine that only half of the addresses in the provided data 112 need to be validated. Furthermore, in another embodiment, the interested party 122 may decide on an importance level of a specific address in the provided data 112. For example, the interested party 122 may decide that if the place of employment 204 may be determined fraudulent, then the provided data 112 may be given the denial 312 regardless of the veracity of the other locations of the provided data 112.

An example will now be described in which the various embodiments will be explained in a hypothetical scenario. A hypothetical used-car dealer, "XYZ Dealer", may frequently lend vehicles out to customers with poor credit. Due to the poor credit rating of a customer, XYZ Dealer may require that the customer provide multiple reference address (e.g. place of residence, place of employment, place of reference personnel) on a loan application, wherein accurate address data is required for each case.

In an event where the customer has been found in breach of contract (e.g. frequent late payments, large sum of back payment, failing to make a payment), XYZ Dealer may wish to repossess the vehicle on loan to the customer. In a hypothetical proceeding of vehicle repossessing, XYZ Dealer may rely on the accuracy place of residence address provided in the loan application by the customer. Additionally, XYZ Dealer may rely on the persons of reference and the accuracy of the associated addresses provided in the loan application by the customer. Furthermore, XYZ Dealer may discover throughout the process of vehicle repossession that the customer has in fact provided fraudulent addresses for the place of residence, place of employment, reference personnel, etc. If this is the case, the extent that XYZ Dealer is defrauded may range from not receiving a payment to the extremity of never being able to repossess the vehicle.

Since the problem of inaccurate reference data on a loan application may frequently occur for XYZ Dealer, a veracity server, similar to the one disclosed above, may be employed to fix this problem. In a hypothetical scenario, a customer of XYZ Dealer signs a loan agreement with XYZ Dealer to finance the purchase of a vehicle. The customer fills out the application fraudulently with a purposeful intent to mislead XYZ Dealer as it relates to reference information. In an effort to safeguard against customer fraud, XYZ Dealer discloses in the loan agreement the use of the veracity server to validate the customer and that a geospatial circuit and/or a transmitter are hidden in the vehicle. Further, XYZ Dealer inputs the address data into the storage of the veracity server. Furthermore, XYZ Dealer may choose to configure, through a software module, a level of relevance regarding how strict the correlation must be between the addresses provided by the customer and the location data transmitted from the geospatial circuit.

As the fraudulent customer uses the vehicle throughout the period of the loan agreement, the geospatial circuit continuously transmits a history of location data back to the veracity server located at XYZ Dealership. The veracity server keeps a tally of how many times the vehicle occurred at the provided addresses and also notes other data such as time, duration, and proximity. According to how the veracity server is configured by XYZ Dealer, the veracity server may determine whether enough occurrences of the vehicle at the location of at least one of the reference addresses have been recorded in order to determine that a particular address is truthful.

In the hypothetical scenario where the customer provides fraudulent information, the XYZ Dealer will be able to determine very quickly through the veracity server that the customer does not visit the addresses provided on the application (e.g. vehicle does not appear to frequent the address of residency, vehicle never visits address of employer, etc.). XYZ Dealer may then find the customer in a breach of the loan agreement since the XYZ Dealer may be alerted that the loan agreement may comprise false information. Additionally, if the customer is incompliant with the request of the XYZ Dealer to return the vehicle, the veracity server will be able to provide recent location data of the vehicle to XYZ Dealer thus making the repossession of the vehicle easier.

Although the present embodiments have been described with reference to a specific example embodiment, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer device). Accordingly, the specification and drawings are to be regarded in an illustrative in rather than a restrictive sense.

What is claimed is:

1. A method comprising:
    associating, by a processor communicatively coupled to a machine-readable memory, a set of personal information of an individual with a vehicle based on an identifier thereof, the set of personal information being provided once by the individual as part of the agreement associated with the vehicle, and the set of personal information comprising:
        a contact address of the individual,
        an address of an employer of the individual, and
        an address of a reference personnel of the individual,
    continuously determining, through a geospatial circuit hidden in the vehicle communicatively coupled to the processor, geospatial locations of the vehicle during a duration of the agreement;
    configuring, through the processor, a level of correlation required between the continuously determined geospatial locations of the vehicle and each of the contact address of the individual, the address of the employer of the individual and the address of the reference personnel of the individual during the duration of the agreement;
    maintaining, through the processor, a tally of times corresponding to occurrence of the vehicle at specific geospatial locations, time durations of the occurrence of the vehicle at the specific geospatial locations, and proximity of the vehicle to the specific geospatial locations during the duration of the agreement; and
    determining, through the processor, a veracity of at least one of: the contact address of the individual, the address of the employer of the individual and the address of the reference personnel of the individual in accordance with the configured level of correlation based on analyzing the maintained tally of times corresponding to the occurrence of the vehicle at the specific geospatial locations, the time durations of the occurrence of the vehicle at the specific geospatial locations, and the proximity of the vehicle to the specific geospatial locations during the duration of the agreement to determine a breach of the agreement.

2. The method of claim 1, comprising validating a locational veracity of the at least one of: the contact address of the individual, the address of the employer of the individual and the address of the reference personnel of the individual in accordance with a geospatial location of the vehicle determining the veracity thereof.

3. The method of claim 2,
    wherein the individual is alerted at the geospatial location of the vehicle, and
    wherein the alert is at least one of an email, a Short Message Service (SMS) text message, voicemail, a phone call, and an in-car alert service of the vehicle.

4. The method of claim 1, further comprising generating an alert in accordance with a status of a validation condition being violated based on the geospatial location of the vehicle,
    wherein the alert notifies at least one of: an interested party and the individual.

5. The method of claim 4, further comprising:
permitting, through a user interface provided through the processor, the interested party to configure a parameter of relevance associated with an algorithm used in determining correlation of the continuously determined geospatial locations to the each of the contact address of the individual, the address of the employer of the individual and the address of the reference personnel of the individual.

6. The method of claim 5, wherein the parameter of relevance comprises:
duration data of the vehicle at the specific geospatial locations,
frequency data of the vehicle at the specific geospatial locations,
proximity data of the vehicle at the specific geospatial locations, and
stop time data of the vehicle at the specific geospatial locations.

7. The method of claim 1, further comprising:
communicating between the geospatial circuit and a global positioning system (GPS) satellite to obtain geospatial location data corresponding to the geospatial locations of the vehicle,
wherein the geospatial circuit communicates with the processor by at least one communication standard including:
Global System for Mobile communications (GSM), and
Code Division Multiple Access (CDMA).

8. A veracity server comprising:
a machine-readable memory comprising a set of personal information of an individual with a vehicle, the set of personal information being provided once by the individual as part of an agreement associated with the vehicle, and the set of personal information comprising:
a contact address of the individual,
an address of an employer of the individual, and
an address of a reference personnel of the individual; and
a processor communicatively coupled to the machine-readable memory, the processor being configured to execute instructions to:
associate the set of personal information of the individual with the vehicle based on an identifier thereof,
continuously determine, in conjunction with a geospatial circuit hidden in the vehicle, geospatial locations of the vehicle during a duration of the agreement,
configure a level of correlation required between the continuously determined geospatial locations of the vehicle and each of the contact address of the individual, the address of the employer of the individual and the address of the reference personnel of the individual during the duration of the agreement,
maintain a tally of times corresponding to occurrence of the vehicle at specific geospatial locations, time durations of the occurrence of the vehicle at the specific geospatial locations, and proximity of the vehicle to the specific geospatial locations during the duration of the agreement, and
determine a veracity of at least one of: the contact address of the individual, the address of the employer of the individual and the address of the reference personnel of the individual in accordance with the configured level of correlation based on analyzing the maintained tally of times corresponding to the occurrence of the vehicle at the specific geospatial locations, the time durations of the occurrence of the vehicle at the specific geospatial locations, and the proximity of the vehicle to the specific geospatial locations during the duration of the agreement to determine a breach of the agreement.

9. The veracity server of claim 8, wherein the processor is configured to execute instructions to:
validate a locational veracity of the at least one of: the contact address of the individual, the address of the employer of the individual and the address of the reference personnel of the individual in accordance with a geospatial location of the vehicle determining the veracity thereof.

10. The veracity server of claim 8, wherein the processor is further configured to execute instructions to:
generate an alert in accordance with a status of a validation condition being violated based on the geospatial location of the vehicle,
wherein the alert notifies at least one of: an interested party and the individual.

11. The veracity server of claim 10,
wherein the individual is alerted at the geospatial location of the vehicle, and
wherein the alert is at least one of an email, an SMS text message, voicemail, a phone call, and an in-car alert service of the vehicle.

12. The veracity server of claim 10, wherein the processor is further configured to execute instructions to:
permit, through a user interface, the interested party to configure a parameter of relevance associated with an algorithm used in determining correlation of the continuously determined geospatial locations to the each of the contact address of the individual, the address of the employer of the individual and the address of the reference personnel of the individual.

13. The veracity server of claim 12, wherein the parameter of relevance further comprises:
duration data of the vehicle at the specific geospatial locations,
frequency data of the vehicle at the specific geospatial locations,
proximity data of the vehicle at the specific geospatial locations, and
stop time data of the vehicle at the specific geospatial locations.

14. The veracity server of claim 8, wherein the processor is configured to execute instructions to:
enable communication between the geospatial circuit and a GPS satellite to obtain geospatial location data corresponding to the geospatial locations of the vehicle,
wherein the geospatial circuit communicates with the veracity server by at least one communication standard including:
GSM, and
CDMA.

15. A system comprising:
a vehicle comprising a geospatial circuit hidden therein; and
a veracity server comprising a set of personal information of an individual with the vehicle, the set of personal information being provided once by the individual as part of an agreement associated with the vehicle, the set of personal information comprising:
a contact address of the individual,
an address of an employer of the individual, and
an address of a reference personnel of the individual, and the veracity server being configured to:
associate the set of personal information of the individual with the vehicle based on an identifier thereof, continuously determine, in conjunction with the geospatial circuit hidden in the vehicle, geospatial locations of the vehicle during a duration of the agreement, configure a level of correlation required between the continuously determined geospatial locations of the vehicle and each of the contact address of the individual, the address of the employer of the individual and the address of the reference personnel of the individual during the duration of the agreement, maintain a tally of times corresponding to occurrence of the vehicle at specific geospatial locations, time durations of the occurrence of the vehicle at the specific geospatial locations, and proximity of the vehicle to the specific geospatial locations during the duration of the agreement, and determine a veracity of at least one of: the contact address of the individual, the address of the employer of the individual and the address of the reference personnel of the individual in accordance with the configured level of correlation based on analyzing the maintained tally of times corresponding to the occurrence of the vehicle at the specific geospatial locations, the time durations of the occurrence of the vehicle at the specific geospatial locations, and the proximity of the vehicle to the specific geospatial locations during the duration of the agreement to determine a breach of the agreement.

16. The system of claim 15, wherein the veracity server is configured to:
validate a locational veracity of the at least one of: the contact address of the individual, the address of the employer of the individual and the address of the reference personnel of the individual in accordance with a geospatial location of the vehicle determining the veracity thereof.

17. The system of claim 15, wherein the veracity server is further configured to:
generate an alert in accordance with a status of a validation condition being violated based on the geospatial location of the vehicle,
wherein the alert notifies at least one of: an interested party and the individual.

18. The system of claim 17, wherein the veracity server is further configured to:
permit, through a user interface, the interested party to configure a parameter of relevance associated with an algorithm used in determining correlation of the continuously determined geospatial locations to the each of the contact address of the individual, the address of the employer of the individual and the address of the reference personnel of the individual.

19. The system of claim 17, wherein the parameter of relevance further comprises:
duration data of the vehicle at the specific geospatial locations,
frequency data of the vehicle at the specific geospatial locations,
proximity data of the vehicle at the specific geospatial locations, and
stop time data of the vehicle at the specific geospatial locations.

20. The system of claim 15, wherein the veracity server is configured to:
enable communication between the geospatial circuit and a GPS satellite to obtain geospatial location data corresponding to the geospatial locations of the vehicle,
wherein the geospatial circuit communicates with the veracity server by at least one communication standard including:
GSM, and
CDMA.

* * * * *